United States Patent
Nagatsuka

(10) Patent No.: US 12,518,376 B2
(45) Date of Patent: Jan. 6, 2026

(54) IMAGE PROCESSING APPARATUS, RADIOGRAPHIC IMAGING SYSTEM, STORAGE MEDIUM, AND IMAGE PROCESSING METHOD

(71) Applicant: Konica Minolta, Inc., Tokyo (JP)

(72) Inventor: Sumiya Nagatsuka, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 558 days.

(21) Appl. No.: 17/818,769

(22) Filed: Aug. 10, 2022

(65) Prior Publication Data

US 2023/0067560 A1   Mar. 2, 2023

(30) Foreign Application Priority Data

Aug. 27, 2021  (JP) ................................. 2021-138988

(51) Int. Cl.
 *G06T 7/00* (2017.01)
 *A61B 6/00* (2006.01)
(52) U.S. Cl.
 CPC ............ *G06T 7/0012* (2013.01); *A61B 6/486* (2013.01); *G06T 2207/10116* (2013.01)
(58) Field of Classification Search
 None
 See application file for complete search history.

(56) References Cited

U.S. PATENT DOCUMENTS

| | | | |
|---|---|---|---|
| 2020/0110044 A1* | 4/2020 | Fukazu | .................... G06F 3/14 |
| 2021/0383542 A1* | 12/2021 | Kitano | ................ A61B 6/0492 |
| 2022/0343567 A1* | 10/2022 | O'Connor | ............ G06T 11/008 |

FOREIGN PATENT DOCUMENTS

| | | |
|---|---|---|
| JP | 2016-101358 A | 6/2016 |
| JP | 2019-051322 A | 4/2019 |
| JP | 2020-171475 A | 10/2020 |
| JP | 6870763 B1 | 5/2021 |
| WO | 2021/033667 A1 | 2/2021 |

OTHER PUBLICATIONS

Machine translation of WIPO Document No. 2021/033667, Matsuura, Feb. 25, 2021 (Year: 2021).*
JPO, Office Action for the corresponding Japanese application No. 2021-138988, dated Apr. 26, 2022, with English translation.

* cited by examiner

*Primary Examiner* — Mark R Milia
(74) *Attorney, Agent, or Firm* — LUCAS & MERCANTI, LLP

(57) ABSTRACT

An image processing apparatus processes a dynamic image including a plurality of frames obtained from a radiographic imaging apparatus performing radiographic dynamic imaging, and includes a hardware processor that performs a process of reducing an unexpected image of a structural object other than a subject, when the structural object is unexpectedly captured in the dynamic image including the plurality of frames obtained by the dynamic imaging.

15 Claims, 8 Drawing Sheets

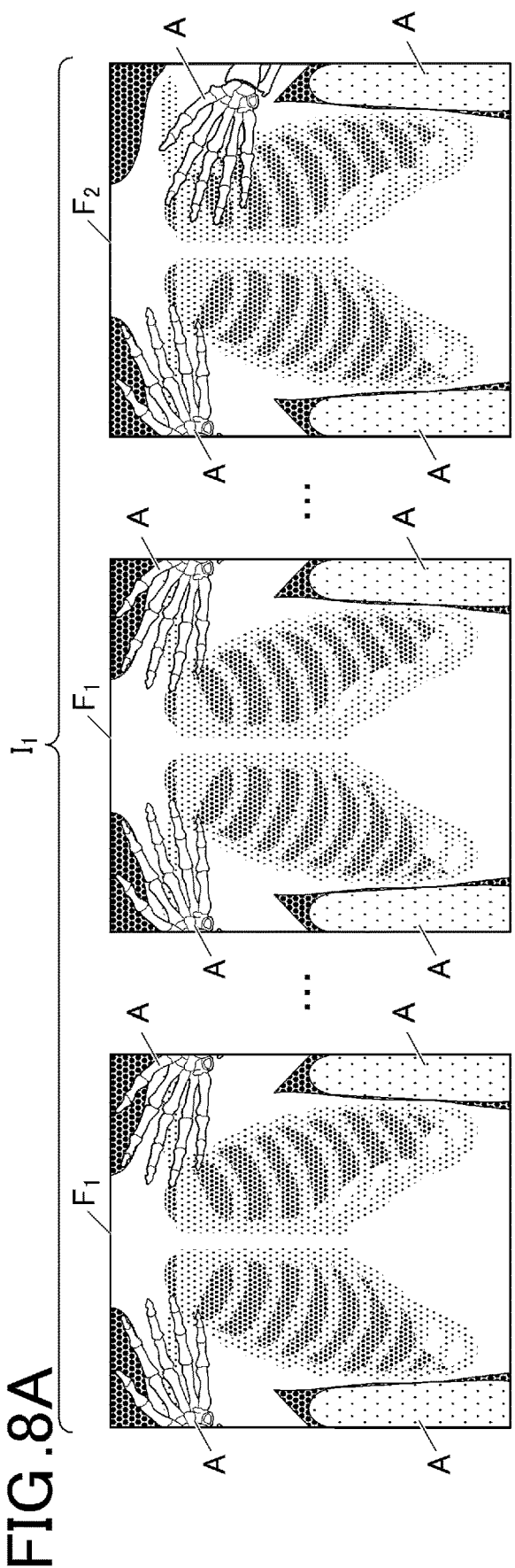
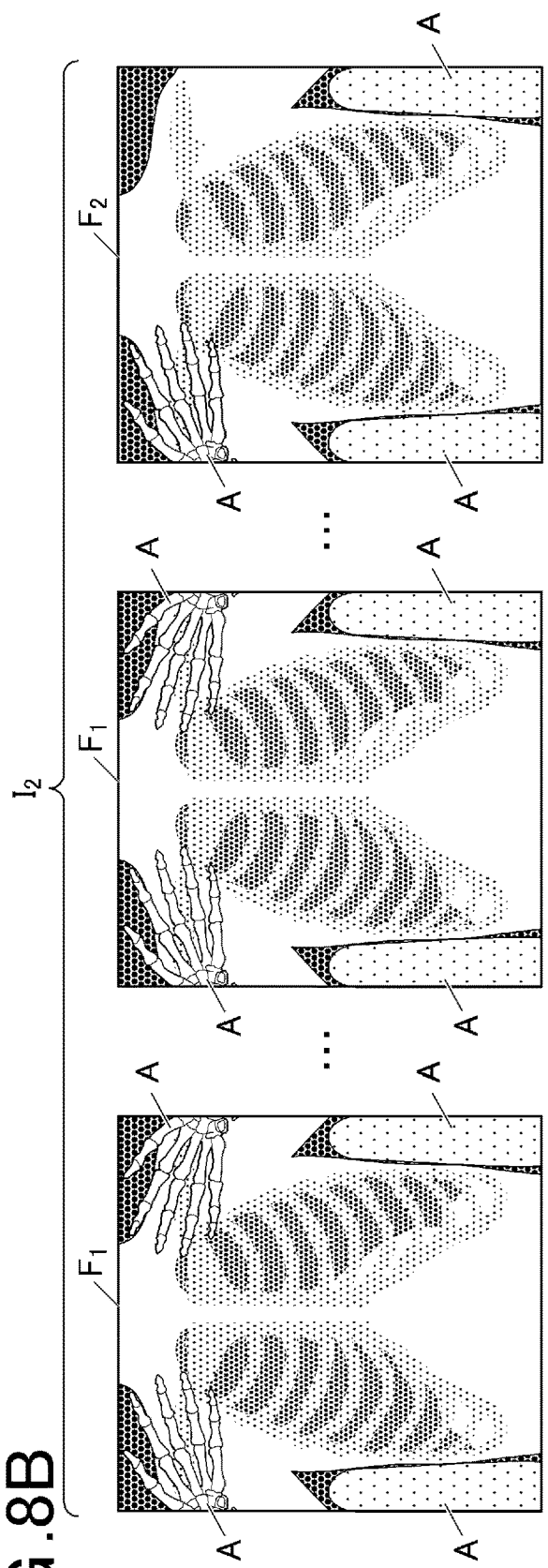
FIG.8A
FIG.8B

IMAGE PROCESSING APPARATUS, RADIOGRAPHIC IMAGING SYSTEM, STORAGE MEDIUM, AND IMAGE PROCESSING METHOD

The entire disclosure of Japanese Patent Application No. 2021-138988, filed on Aug. 27, 2021, is incorporated herein by reference in its entirety.

BACKGROUND

Technological Field

The present invention relates to an image processing apparatus, a radiographic imaging system, an image processing program, and an image processing method.

Description of the Related Art

In radiographic dynamic imaging, in order to facilitate reading of obtained dynamic images, various technologies for processing the dynamic images have been proposed.

For example, JP 2020-171475 A describes a technology that analyzes a dynamic image including multiple frames, and excludes, from the dynamic image, defect areas of the dynamic image that contain noise components at a predetermined level or higher.

JP 6870763 B1 describes a technology that does not display the entire accompanying information attached to certain frames when displaying multiple frames.

SUMMARY

Unlike normal imaging, dynamic imaging requires a certain time period (e.g., about several tens of seconds) for one time of imaging.

In a case where a subject unnecessarily moves during dynamic imaging, required motions cannot be analyzed through an obtained dynamic image, and re-imaging is required accordingly.

Since in dynamic imaging the dosage to the subject increases with the time period taken, it is required to prevent re-imaging as much as possible.

Owing to such situations, during dynamic imaging, the subject is requested to hold the same posture.

Conventionally, during dynamic imaging, a practice has been conducted that interposes an imaging support between a bed and the subject, or has an imaging assistant hold the subject, thus preventing the subject from unnecessarily moving.

Accordingly, in a dynamic image, a structural object, such as the imaging support or a hand of the imaging assistant, is unexpectedly taken.

Such an unexpected image of the structural object sometimes hinders a doctor from image reading.

Particularly in the case of regulating the subject's motions by the imaging assistant holding the subject, the assistant sometimes moves a hand owing to fatigue or the like in the middle of the dynamic imaging.

In case of such a motion of the hand during dynamic imaging, the hand is captured at the same position in most of frames among the multiple frames constituting a dynamic image. However, in some of the remaining frames, the hand is captured at positions different from those in the majority of frames.

When such a dynamic image where the captured positions of the hand are different in some frames is reproduced as it is, the captured image of the hand flickers (the hand is momentarily displayed in an area where the subject or nothing has been displayed so far). Such flickers sometimes hinder the doctor from reading the image.

The present invention has been made in view of the problem described above, and has an objective to prevent a presence of a structural object from affecting reading of an obtained dynamic image, even in a case of dynamic imaging while preventing the subject from unnecessarily moving by the structural object.

To solve the above problem, an image processing apparatus according to an aspect of the present invention is an image processing apparatus that processes a dynamic image including a plurality of frames obtained from a radiographic imaging apparatus performing radiographic dynamic imaging, the image processing apparatus including a hardware processor that performs a process of reducing an unexpected image of a structural object other than a subject, when the structural object is unexpectedly captured in the dynamic image including the plurality of frames obtained by the dynamic imaging.

A radiographic imaging system according to an aspect of the present invention includes:

a radiation source that generates radiation; and a radiographic imaging apparatus that performs radiographic dynamic imaging, the radiographic imaging system further including a hardware processor that performs a process of reducing an unexpected image of a structural object other than a subject, when the structural object is unexpectedly captured in the dynamic image including the plurality of frames obtained by the dynamic imaging.

A non-transitory computer-readable storage medium storing an image processing program according to an aspect of the present invention is a non-transitory computer-readable storage medium storing an image processing program of processing a dynamic image including a plurality of frames obtained from a radiographic imaging apparatus performing radiographic dynamic imaging, the program causing a computer to perform reducing an unexpected image of a structural object other than a subject, when the structural object is unexpectedly captured in the dynamic image including the plurality of frames obtained by the dynamic imaging.

An image processing method according to an aspect of the present invention is an image processing method of processing a dynamic image including a plurality of frames obtained from a radiographic imaging apparatus performing radiographic dynamic imaging, the image processing method including reducing an unexpected image of a structural object other than a subject, when the structural object is unexpectedly captured in the dynamic image including the plurality of frames obtained by the dynamic imaging.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8A is an image diagram showing an example of frames of a dynamic image displayed by a conventional radiographic imaging system, and FIG. 8B is an image diagram showing frames of a dynamic image displayed by the radiographic imaging system according to the embodiment;

DETAILED DESCRIPTION OF EMBODIMENT

Hereinafter, an embodiment of the present invention is described with reference to the drawings. Note that the technological scope of the present invention is not limited to the embodiment and illustrated examples described below.

<1. Radiographic Imaging System>

First, a schematic configuration of a radiographic imaging system according to the embodiment (hereinafter a system 100) is described.

Figure 1:
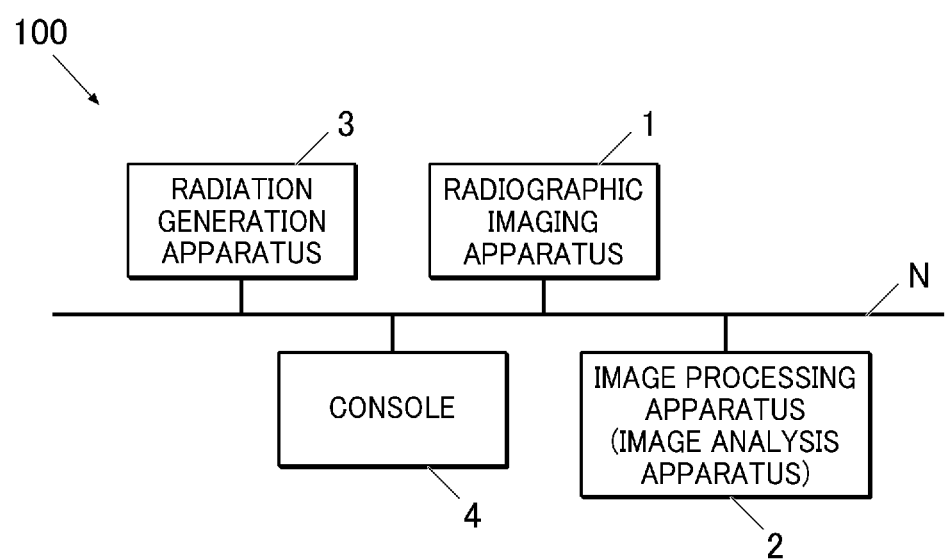
FIG. 1 is a block diagram showing an example of a radiographic imaging system according to an embodiment of the present invention.
Figure 2:
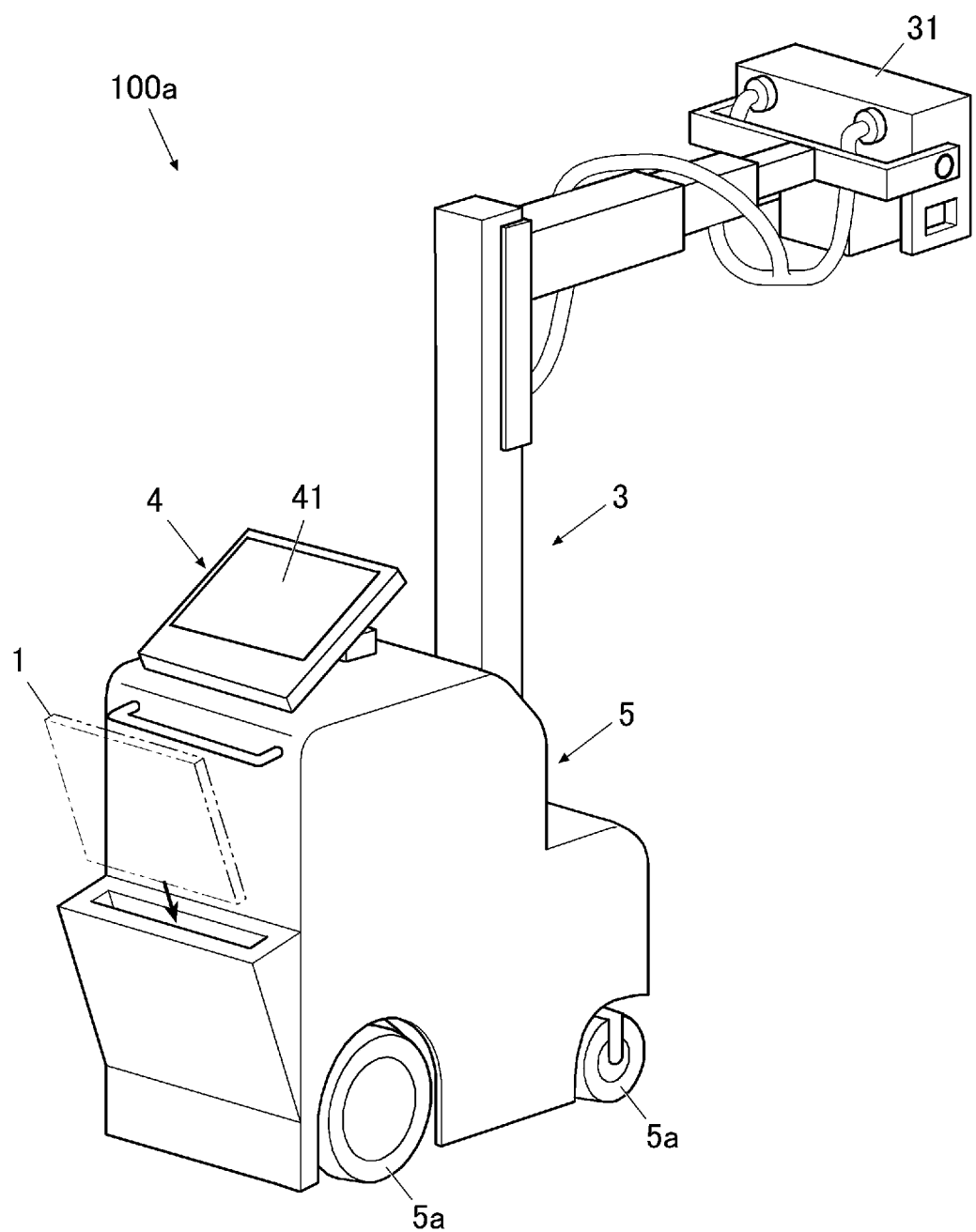
FIG. 2 is a perspective view showing a configuration example of part of the system.
Figure 3:
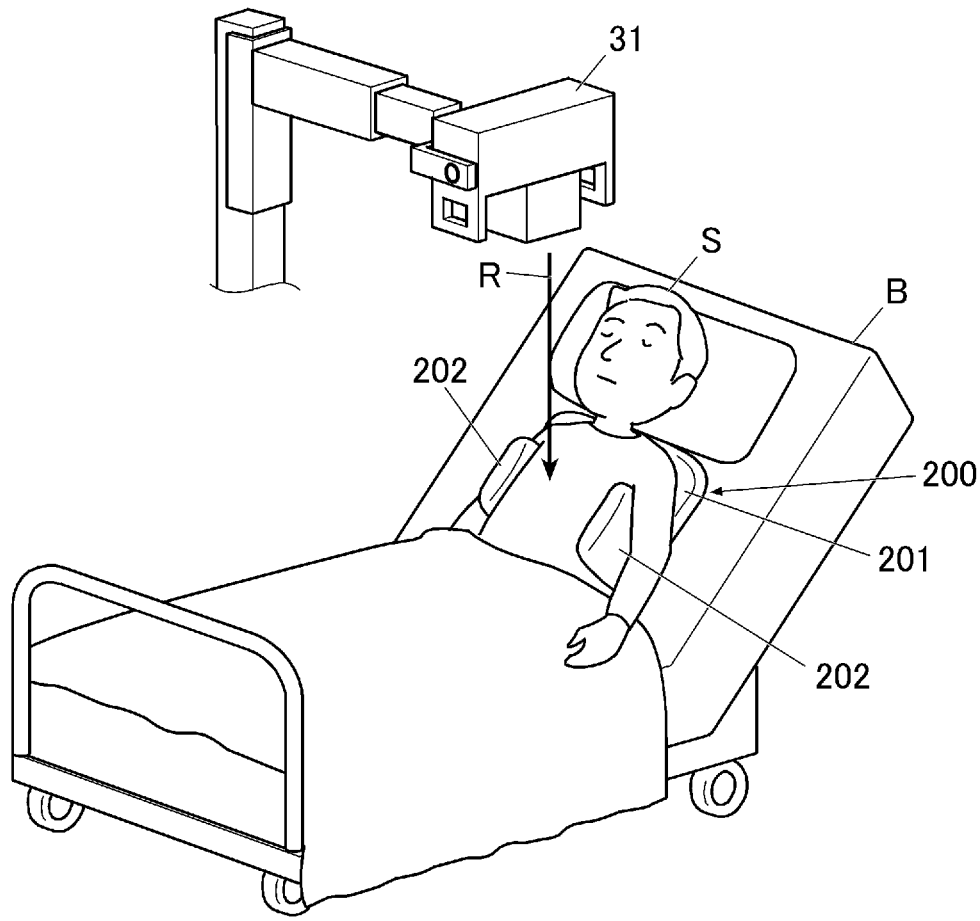
FIG. 3 is a perspective view showing an example of an imaging support used for dynamic imaging using the system.

FIG. 1 is a block diagram showing an example of the system 100. FIG. 2 is a perspective view showing a configuration example of part of the system 100. FIG. 3 is a perspective view showing an imaging support used for dynamic imaging using the system 100.

For example, as shown in FIG. 1, the system 100 includes a radiographic imaging apparatus (hereinafter an imaging apparatus 1), and an image processing apparatus (hereinafter a processing apparatus 2).

The system 100 according to the embodiment further includes a radiation generation apparatus (hereinafter a generation apparatus 3), and a console 4.

The apparatuses 1 to 4 are capable of communicating with each other via a communication network N (a local area network (LAN), a wide area network (WAN), the Internet, etc.), for example.

For example, as shown in FIG. 2, in the system 100 according to the embodiment, the imaging apparatus 1 has a panel shape (portable).

The generation apparatus 3 and the console 4 according to the embodiment have portable configurations.

The generation apparatus 3 and the console 4 according to the embodiment are mounted in a housing 5 that includes wheels 5a, thus achieving a movable configurations.

That is, the imaging apparatus 1, the generation apparatus 3 and the console 4 constitute a monitoring round vehicle 100a.

The monitoring round vehicle 100a may be movable by means other than the wheels 5a.

Alternatively, the system 100 may be fixedly installed in an imaging room.

The system 100 may be capable of communicating with a hospital information system (HIS), a radiology information system (RIS), a picture archiving and communication system (PACS) and the like, which are not shown.

[1-1. Radiation Generation Apparatus]

As shown in FIG. 2, the generation apparatus 3 includes a radiation source 31.

The generation apparatus 3 further includes a generator, not shown, and an irradiation instruction switch, not shown.

Based on an operation on the irradiation instruction switch, the generator applies, to the radiation source 31, a voltage dependent on preset imaging conditions (e.g., conditions about a subject (e.g., a site to be imaged, an imaging direction, a body type, etc.), and conditions about emission of radiation (e.g., a tube voltage, a tube current, an irradiation time, a current-time product (mAs value), etc.)), and applies current in accordance with the imaging conditions, to the radiation source 31.

When the voltage is applied from the generator and current flows, the radiation source 31 generates radiation R (e.g., X-ray etc.; see FIG. 3) dependent on the imaging conditions.

The radiation source 31 can move in the front and rear direction, the lateral direction and the vertical direction with respect to the monitoring round vehicle 100a, and change the direction of a radiation emission port to any direction.

The generation apparatus 3 generates radiation in a mode conforming to the style of a radiograph to be obtained (a still image, or a dynamic image including multiple frames).

In a case of normal imaging for obtaining a still image, radiation is emitted only one time per pressing of the irradiation instruction switch.

In a case of dynamic imaging for obtaining a dynamic image, pulse-emission of radiation is repeatedly performed multiple times (e.g., 15 times per second) every predetermined time period, or emission of radiation is continued for a predetermined time period, per pressing of the irradiation instruction switch.

Note that "dynamic imaging" encompasses moving image taking, but does not encompass taking of a still image while displaying a moving image.

A "dynamic image" encompasses a moving image, but does not encompass an image obtained by taking a still image while displaying a moving image.

[1-2. Radiographic Imaging Apparatus]

The imaging apparatus 1 performs radiographic dynamic imaging.

Although not shown, the imaging apparatus 1 includes a sensor board, a scanning circuit, a reading circuit (hereinafter ROIC), a controller, and a communicator.

On the sensor board, radiation detection elements that generate charges dependent on dosage of received radiation, and switch elements that accumulate and discharge the charges are two-dimensionally arranged (in a matrix).

The ROIC is a scanning circuit that switches on and off each switch element, and reads the amount of charges discharged from each pixel, as a pixel value.

The controller generates a radiograph from the multiple pixel values read by the ROIC.

The communicator transmits data on the generated radiograph, various signals and the like to the outside, and receives various types of information and various signals.

In synchronization with the timing when radiation is emitted from the generation apparatus 3, the imaging apparatus 1 accumulates and discharges charges, and reads pixel values, thereby generating a radiograph dependent on the dosage of emitted radiation.

In the case of normal imaging, a radiograph is generated only one time per pressing of the irradiation instruction switch.

In the case of dynamic imaging, frames constituting a dynamic image are generated multiple times (e.g., 15 times per second) every predetermined time per pressing of the irradiation instruction switch.

The imaging apparatus 1 converts the generated dynamic image into a form of image data, and transfers the data to another apparatus (e.g., the processing apparatus 2, the console 4, etc.).

Note that the imaging apparatus 1 may store the generated dynamic image in the form of image data.

The imaging apparatus 1 may cause a display device connected to this apparatus to display the generated dynamic image in real time.

Examples of displaying in real time include, for example, fluoroscopy.

[1-3. Console]

The console 4 sets the imaging conditions in at least one of the imaging apparatus 1 and the generation apparatus 3.

The console 4 according to the embodiment is made up of a PC in which a dedicated program is installed, a dedicated apparatus or the like.

As shown in FIG. 2, the console 4 according to the embodiment includes a display 41.

The console 4 according to the embodiment sets the imaging conditions, based on imaging order information obtained from another system (HIS, RIS or the like) or on an operation performed by a user (e.g., a technologist).

[1-4. Image Processing Apparatus]

The processing apparatus 2 processes a dynamic image obtained from the imaging apparatus 1.

The processing apparatus 2 according to the embodiment also serves as a dynamic analysis apparatus.

That is, the processing apparatus 2 according to the embodiment analyzes the dynamic image, and generates a dynamic analysis image.

The dynamic analysis image includes, for example, a ventilation analysis image, and a blood flow analysis image.

The ventilation analysis image is an image where a visualized analysis result of expansion and contraction of a lung field is visually overlaid on the dynamic image.

The blood flow analysis image is an image where a visualized analysis result of blood flows in blood vessels in the lung field is visually overlaid on the dynamic image.

The details of the processing apparatus 2 are described later.

[1-5. Imaging Support]

When dynamic imaging through use of the system 100 is performed, an imaging support (hereinafter a support 200) is sometimes used.

The support 200 can be deformed between a first state and a second state.

The first state is a state of being relatively easily carried.

The second state is a state different from the first state, and is a state of allowing the subject during dynamic imaging to be fixed.

At least part of the support 200 according to the embodiment is hollow.

By emitting gas (air, nitrogen, etc.) from the inside of the hollow portion, the support 200 comes into the contracted state (first state). By storing the gas in the hollow portion, the support 200 comes into the expanded state (second state).

Note that the strength of the support 200 for supporting a fixation target site may be adjustable by increasing and reducing the amount of internal air in the expanded state. Such a configuration can prevent necessary motions (e.g., respiration) of the subject from being hindered by a possible too high strength, and prevent the subject from being let to unnecessarily move by a possible too low strength.

The support 200 may be configured to be expanded or contracted by liquid or the like.

The support 200 may be deformable (e.g., folded and unfolded, expanded and contracted or the like) without using any fluid.

The support 200 according to the embodiment can fix the fixation target site of the subject in the second state.

The fixation target site is a site other than a diagnosis target site (e.g., the diaphragm, an upper part of the lung field, etc.), and includes at least one of a pair of shoulders and a pair of hips.

The support 200 assuming hips as fixation target sites may be, for example, a mat type one as shown in FIG. 3.

The mat-type support 200 has a substantially T-shape in a front view that includes a first portion 201 extending in the vertical direction, and a pair of second portions 202 extending in the lateral direction from the right and left ends of an upper part of the first portion 201, in the contracted state.

On the other hand, in the expanded state, the second portions 202 of the mat-type support 200 are in a state of being bent so as to protrude forward from the first portion 201.

After the subject lies on a bed B where such a mat-type support 200 is arranged, a portion of the bed B serving as a backrest is inclined and brings the upper body of the subject into a state of being raised, and the support 200 is brought into the expanded state, the first portion 201 supports the hips and back of the subject S, and the pair of second portions 202 allows the hips of the subject S to be interposed between the right and left and fixed.

Thus, the support 200 regulates the chest of the subject S not to slip downward or be laterally inclined.

Note that the mat-type support 200 may be used to fix a subject S in a decubitus position (a state where the portion of the bed B serving as the backrest is not inclined, and the upper body is not raised).

The support 200 assuming shoulders as fixation target sites may be, for example, a shoulder harness or the like.

Note that when dynamic imaging through use of the system 100 is performed, a conventional fixation device (e.g., a box-shaped one having a triangular shape in a plan view for fixing the hips of the subject) may be used.

The support 200 according to the embodiment is disposed at an imaging position, and can support a portable imaging apparatus 1 that generates a radiograph dependent on received radiation.

For example, in a case of radiographing using the mat-type support 200 shown in FIG. 3, the imaging apparatus 1 is disposed between the first portion 201 and the back of the subject so that a radiation entrance surface is in contact with the back.

Here, after the support 200 comes into the expanded state, the pair of second portions 202 allows the subject to be interposed at the hips of this subject together with the right and left sides of the imaging apparatus 1 and thus be fixed.

Note that the support 200 may support a grid, not shown, which is used to be overlaid on the radiation entrance surface of the imaging apparatus 1, or support both the imaging apparatus 1 and the grid together.

[1-6. Test Flow]

A test using the thus configured system 100 according to the embodiment is performed according to the following flow.

First, the user (technologist etc.) dynamically takes radiographs of a diagnosis target site of the subject using the monitoring round vehicle 100*a* and the imaging apparatus 1. The imaging apparatus 1 then generates image data on a dynamic image where the diagnosis target site is captured.

In the case where during radiographing, the support 200 is interposed between the bed and the subject, or an imaging assistant holds the subject, and prevents unnecessary motions of the subject at dynamic imaging, a structural object (the support 200, a hand of the imaging assistant, etc.) is sometimes unintentionally captured in the generated dynamic image.

After the imaging apparatus 1 generates image data, this apparatus transmits the image data to the processing apparatus 2.

Upon receipt of the image data, the processing apparatus 2 executes an image output process (described in detail later). The unexpected image in the dynamic image is thus reduced, and the image data on the dynamic image with the reduced unexpected image is transmitted to the console 4.

Upon receipt of the image data, the console 4 displays a dynamic image in accordance with a received image signal.

A doctor diagnoses the subject, based on the radiograph displayed on the console 4.

[1-7. Radiographic Imaging System etc.]

The system 100 including the processing apparatus 2, which serves also as the dynamic analysis apparatus, has been described so far. The image processing apparatus may serve also as a console.

Figure 4:
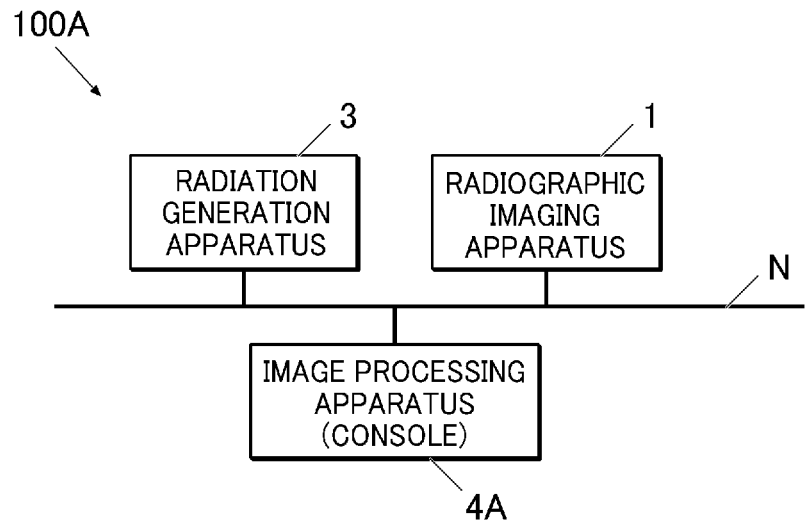
FIG. 4 is a block diagram showing another example of a radiographic imaging system according to the embodiment.

Specifically, for example, as shown in FIG. 4, besides the imaging apparatus 1 and the generation apparatus 3, an image processing apparatus serving also as a console (hereinafter a processing apparatus 4A) may be included in another radiographic imaging system (hereinafter a system 100A).

In this case, the system 100A may include a dynamic analysis apparatus that does not has a function of the image processing apparatus, or include no such an apparatus.

The systems 100 and 100A including the respective processing apparatuses 2 and 4A, which serve also as the other apparatus, have been described so far. The image processing apparatus may be independently provided.

Figure 5:
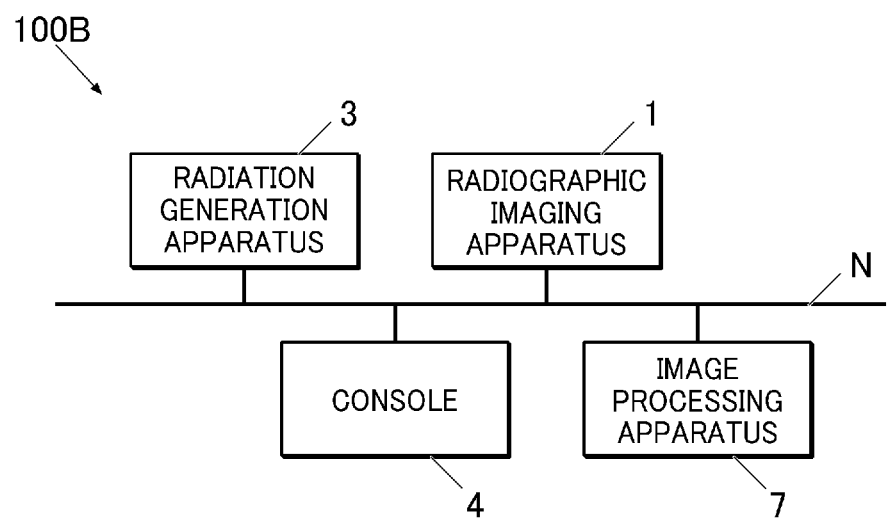
FIG. 5 is a block diagram showing another example of a radiographic imaging system according to the embodiment.

Specifically, for example, as shown in FIG. 5, besides the imaging apparatus 1, the generation apparatus 3 and the console 4, an independent image processing apparatus 7 may be included in another radiographic imaging system (hereinafter a system 100B).

In this case, the image processing apparatus 7 may be mounted in the housing 5 of the monitoring round vehicle 100*a*, or arranged at a place apart from the monitoring round vehicle 100*a*.

In this case, the system 100B may include a dynamic analysis apparatus that does not has a function of the image processing apparatus, or include no such an apparatus.

<2. Details of Image Processing Apparatus>

Next, specific configurations and operations of the processing apparatuses 2, 4A and 7, which are respectively included in the systems 100, 100A and 100B, are described.

Figure 6:
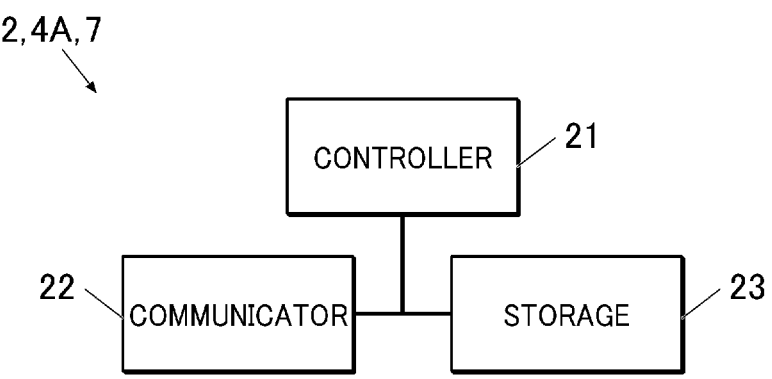
FIG. 6 is a block diagram showing an image processing apparatus included in the radiographic imaging system according to the embodiment.
Figure 7:
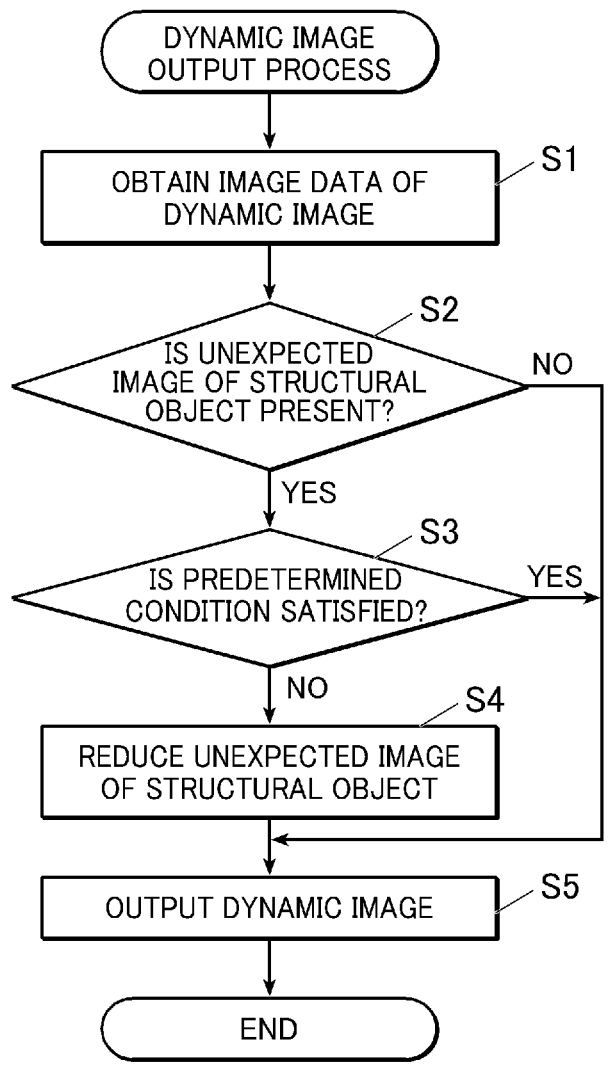
FIG. 7 is a flowchart showing a flow of a dynamic image output process executed by the apparatus.
Figure 9A:
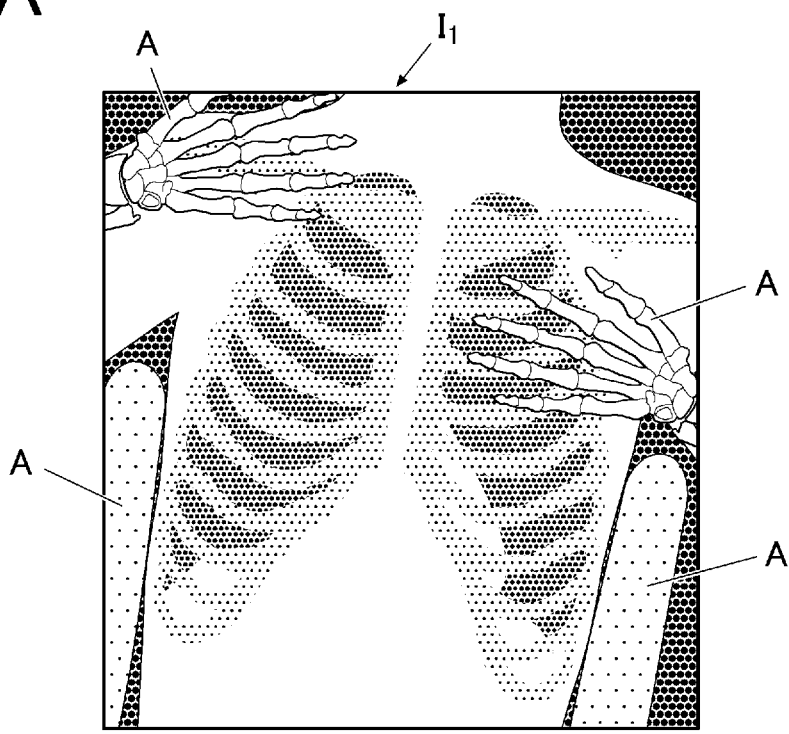
FIG. 9A is an image diagram showing another example of frames of a dynamic image displayed by a conventional radiographic imaging system.
Figure 9B:
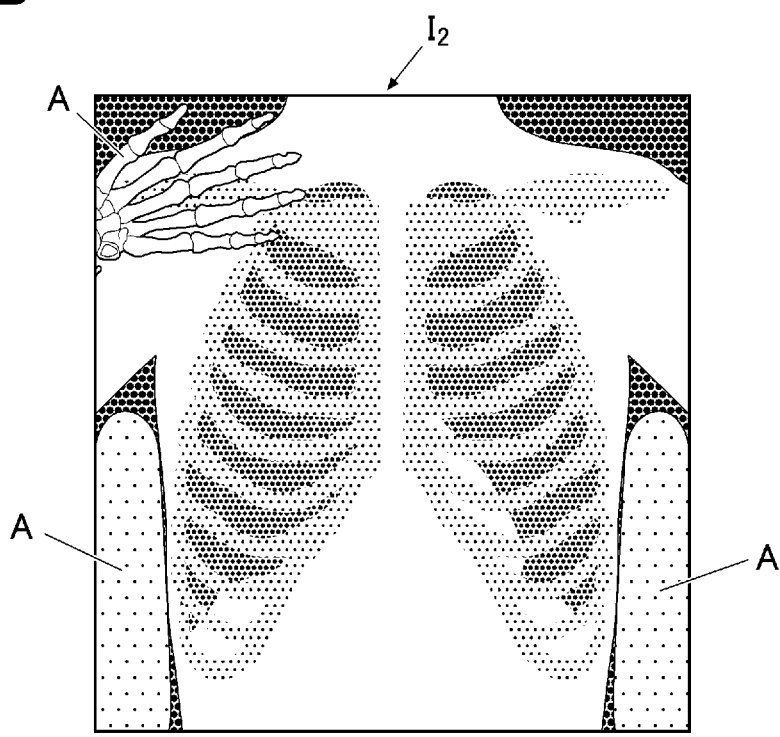
FIG. 9B is an image diagram showing frames of a dynamic image displayed by the radiographic imaging system according to the embodiment.

FIG. 6 is a block diagram showing the processing apparatus 2, 4A and 7. FIG. 7 is a flowchart showing a flow of a dynamic image output process executed by the processing apparatus 2, 4A and 7. FIGS. 8A and 9A are image diagrams showing frames of a dynamic image displayed by a conventional radiographic imaging system. FIGS. 8B and 9B are image diagrams showing frames of a dynamic image displayed by the radiographic imaging system according to the embodiment.

[2-1. Specific Configuration]

As shown in FIG. 6, the processing apparatuses 2, 4A and 7 each include a controller 21, and a communicator 22.

The processing apparatuses 2, 4A and 7 according to the embodiment further include a storage 23.

Each elements 21 to 23 are electrically connected to each other via a bus and the like.

Note that the processing apparatuses 2, 4A and 7 may further include at least one of a display that displays a screen in accordance with an image signal received from the controller 21, and an operation device that outputs, to the controller 21, a control signal in accordance with an operation performed by the user.

The controller 21 includes a central processing unit (CPU), a random access memory (RAM), and a read only memory (ROM).

The ROM stores various programs (including an image processing program described later) to be executed by the CPU, parameters required to execute the programs, and the like.

The CPU reads the various programs stored in the ROM, deploys the programs in the RAM, executes various processes in accordance with the deployed programs, and centrally controls operations of each element of the processing apparatus 2, 4A and 7.

Note that the ROM may be configured to be rewritable (to allow programs to be updated).

The communicator 22 includes a communication module.

The communicator 22 wirelessly or wiredly transmits and receives various signals and various data items to and from other apparatuses (the imaging apparatus 1, the console 4 and the like) connected via the communication network N (a local area network (LAN), a wide area network (WAN), the Internet and the like).

The storage 23 may include a nonvolatile semiconductor memory, and a hard disk.

The storage 23 stores image data, such as of radiographs.

The storage 23 according to the embodiment stores various data items to be used by the dynamic image output process described later.

[2-2. Operation]

At the opportunity of satisfying a predetermined start condition, the controller 21 of the thus configured processing apparatus 2, 4A and 7 executes the dynamic image output process as shown in FIG. 7.

The predetermined start condition may be, for example, turning on of the power of the processing apparatus 2, 4A, and 7, obtainment of image data from another apparatus, reception of a predetermined control signal from another apparatus, execution of a predetermined start operation (in a case where an operation device is provided) or the like.

In first step S1, first, the controller 21 obtains image data on the dynamic image from the imaging apparatus 1.

In step S1 according to the embodiment, the controller 21 receives the image data from another apparatus (the imaging apparatus 1, the console 4 or the like) via the communicator 22.

Note that in this step S1, the controller 21 may read the image data from the storage 23, a medium or the like.

In a case of starting the dynamic image output process at the opportunity of obtaining the image data, this step S1 is not required.

After obtainment of the image data, the controller 21 executes step S2.

In this step S2, the controller 21 determines whether an unexpected image of a structural object other than the subject is present in the dynamic image or not.

The structural object may be the support 200 that fixes the subject, a hand or an arm of the imaging assistant or the like.

In step S2 according to the embodiment, for example, the controller 21 performs comparison with image data on a still image (frame) which is stored in the storage 23 and in which the same diagnosis target site is captured without any unexpected image, and if there is an area with significantly high pixel values, the controller 21 determines that the area includes an unexpected image.

If the controller 21 determines that the unexpected image is present in step S2, the controller 21 further determines the size, position and the like of the unexpected image.

In step S2 according to the embodiment, the controller 21 further determines the position and the like of the area where the diagnosis target site is captured.

In step S2 according to the embodiment, the controller 21 determines presence or absence, the size, the position and the like of an unexpected image with respect to each of multiple frames.

Thus, following steps S3 and S4 are allowed to be performed only for narrowed down frames including an unexpected image required to be reduced. Accordingly, the processing load on the controller 21 can be reduced.

Note that in step S2, the controller 21 may determine presence or absence of an unexpected image only for certain frames (e.g., frames having odd or even frame numbers, or intermediate frames with some frames before and after them being excluded).

In step S2, the controller 21 may obtain image data for comparison from another apparatus every time of comparison.

If the controller 21 determines that no unexpected image is in the dynamic image in step S2 described above (step S2: No), the controller 21 skips steps S3 and S4, and executes step S5 (described in detail later).

On the other hand, if the controller 21 determines that an unexpected image is present in the dynamic image in step S2 described above (step S2: Yes), the controller 21 executes step S3.

In this step S3, the controller 21 determines whether a predetermined condition is satisfied or not.

The predetermined condition may be, for example, the followings.

In every frame, no unexpected image overlaps with an area where the diagnosis target site of the subject is captured.

The size of the unexpected image is equal to or smaller than a predetermined first threshold.

In every frame, an unexpected image overlaps with the area where the diagnosis target site of the subject is captured.

The size of the unexpected image is equal to or larger than a predetermined second threshold (note that the first threshold<the second threshold).

If the predetermined condition is not satisfied in step S3 described above (an unexpected image overlaps with an area where the diagnosis target site is captured in some frames, and the size of the structural object exceeds the first threshold and is less than the second threshold) (step S3: No), the controller 21 executes step S4.

In step S4, the controller 21 executes a process of reducing the unexpected image (hereinafter a reduction process).

In step S4 according to the embodiment, the controller 21 performs the reduction process in accordance with each frame.

If the structural object is the support 200, the controller 21 performs the reduction process, based on data about at least one of the amount of radiographic transmission through the imaging support 200 and the shape of the imaging support 200 stored in the storage 23, for example.

If the structural object is the imaging assistant, the controller 21 performs the reduction process, based on a difference from image data on a still image (frame) which is stored in the storage 23 and in which the same diagnosis target site is captured without any unexpected image, for example.

In step S4 according to the embodiment, based on the position of the area about which determination is made in step S2 and in which the diagnosis target site is captured, the controller 21 corrects the position, angle and the like of the entire image so that frames where movement of the area where the diagnosis target site is captured is identified are disposed at positions before movement of the area where the diagnosis target site is captured.

Note that if the position of the unexpected image is the same in every frame, in this step S4 the controller 21 performs the reduction process for specific frames among the multiple frames, and further performs the reduction process having the same details (the area where the signal values are to be reduced, and the magnitude of the value to be reduced are the same) as those to be performed for the specific frames, for the other frames that are not the specific frames among the multiple frames.

The specific frames may include, for example, the first frame, the last frame, intermediate frames, and a frame where the most characteristic state of the diagnosis target site is captured.

In step S4, the controller 21 may perform the reduction process described above, for all the areas of each frame, or perform this process for a partial area in each frame.

The partial area may be, for example, an area where the diagnosis target site is captured, an upper half area, or a lower half area.

Application only to the partial area can reduce the processing load on the controller 21.

In step S4, the controller 21 may obtain, every time, various image data items for performing the reduction process from another apparatus.

The controller 21 according to the embodiment executes step S4 having been described so far, thus serving as a hardware processor.

Step S4 described above corresponds to a step of reducing the unexpected image of the structural object in the image processing method.

On the other hand, if in step S3 described above the controller 21 determines that the predetermined condition is satisfied (the unexpected image overlaps with the area where the diagnosis target site is captured, the size of the structural object is equal to or smaller than the first threshold or equal to or larger than the second threshold, or the unexpected image is present in every frame) (step S3: Yes), the controller 21 skips step S4 (without performing the reduction process), and executes step S5.

In step S5, the controller 21 outputs a dynamic image based on the image data.

In step S5 according to the embodiment, the controller 21 transmits the image data on the dynamic image to another apparatus (console 4 etc.) including a display, via the communicator 22.

Upon receipt of the image data, the console 4 displays the dynamic image based on the image data, on the display 41.

In a case where an imaging assistant regulates unnecessary motions of a subject during dynamic imaging using the conventional radiographic imaging apparatus by holding the subject, the imaging assistant sometimes moves a hand owing to fatigue or the like in the middle of dynamic imaging.

In this case, for example, as shown in FIG. 8A, unexpected images A of a hand are present at the same position in most of frames $F_1$ among multiple frames constituting the dynamic image $I_1$, while in some of remaining frames $F_2$, unexpected images A are present at positions (diagnosis target site) different from those of the most frames $F_1$.

However, for example, as shown in FIG. 8B, the console 4 according to the embodiment having received the image data displays a dynamic image $I_2$ where the unexpected image A having been present at the position different from that of the most frames $F_1$ is reduced.

In the case where the imaging assistant moves a hand in the middle of dynamic imaging, the area where the diagnosis target site of the subject is captured sometimes moves to a position different from that in a frame previous to a certain frame $F_2$ or is inclined, in the certain frame $F_2$ or several frames after the certain frame $F_2$ among the multiple frames constituting the dynamic image $I_1$, as shown in FIG. 9A.

However, even in such a case, as shown in FIG. 9B, the console 4 according to the embodiment having received the image data displays a dynamic image $I_2$ where the unexpected image A is reduced and the position, angle and the like of the diagnosis target site are corrected.

Note that in cases where the processing apparatus 2, 4A, and 7 includes the display, in this step S5 the controller 21 may display the dynamic data on the dynamic image, on the display of the processing apparatus 2, 4A, and 7.

If a specific predetermined condition is satisfied among the predetermined conditions in step S3 described above, the controller 21 may not only skip step S4 described above but also notify that re-imaging is required in step S5.

The specific predetermined condition may be, for example, the followings.

The every frame, an unexpected image overlaps with the area where the diagnosis target site of the subject is captured.

The size of the unexpected image is equal to or larger than the predetermined second threshold.

The notification is performed by any of methods that include, for example, displaying characters, graphics or the like indicating that re-imaging is required on the display 41 of the console 4, or displaying them on the display of the processing apparatus 2, 4A, and 7, or outputting audio indicating that re-imaging is required, from a speaker, not shown.

The system 100 thus includes a notifier. When a dynamic image where a structural object is not reduced is displayed on the display 41, the user can know the reason as to whether this is because the adverse effect of the unexpected image is minor and the image is not required to be reduced (analysis and reading are allowed without reduction), or because the adverse effect of the unexpected image is too large and a possible reduction process is meaningless (no dynamic image usable for analysis or reading is achieved).

<3. Advantageous Effects>

The processing apparatuses 2, 4A and 7, and the systems 100, 100A and 100B including the respective processing apparatuses 2, 4A and 7, which have been described so far, process the dynamic image $I_1$ including a plurality of frames obtained from the imaging apparatus 1, and include the controller 21 (hardware processor) that performs the process of reducing an unexpected image when an unexpected image of a structural object other than the subject is captured in the dynamic image $I_1$ including the plurality of frames obtained by dynamic imaging.

Accordingly, the processing apparatuses 2, 4A and 7, and the systems 100, 100A and 100B, which include the respective processing apparatuses 2, 4A and 7, can prevent presence of the structural object from affecting reading of the obtained dynamic image even when dynamic imaging is performed while preventing unnecessary motions of the subject by the structural object.

<4. Others>

Note that the present invention obviously is not limited to the above embodiment and the like, and alterations can be made, as appropriate, without departing from the gist of the present invention.

For example, the processing apparatuses 2, 4A and 7 described above may be configured so that in the dynamic image output process, the apparatuses do not execute step S3 (determination of whether the predetermined condition is satisfied or not), and apply the reduction process to all the dynamic images including unexpected images.

The processing apparatuses 2, 4A and 7 may analyze the motions of the unexpected images A of the structural object in the dynamic images $I_1$ and $I_2$, or obtain an analysis result of the motions of the unexpected images A from another apparatus, and display information indicating the motions of the unexpected images A on the dynamic images $I_1$ and $I_2$ in an overlaid manner.

Figure 10:
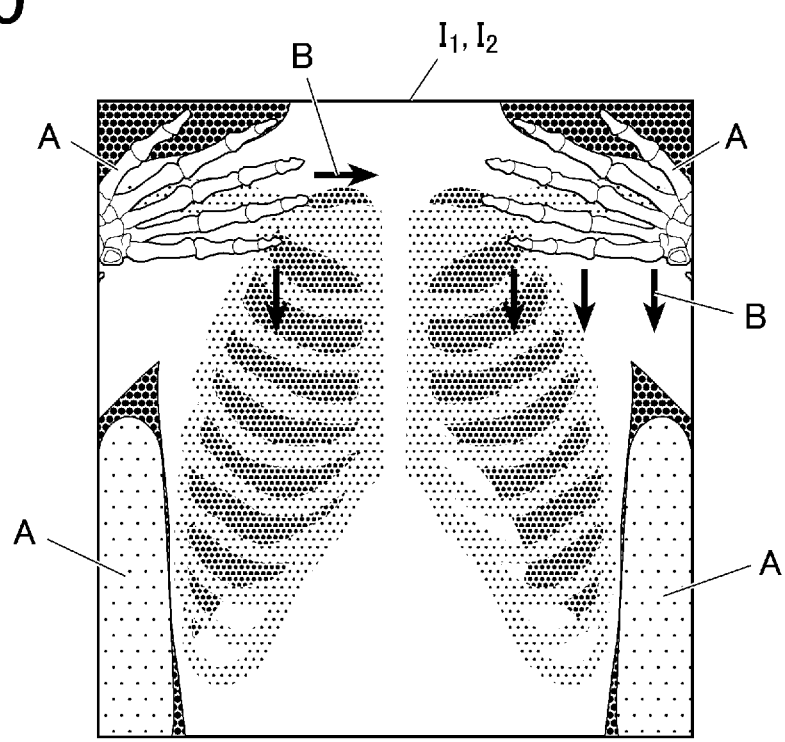
FIG. 10 is an image diagram showing another example of each frame of a dynamic image displayed by the radiographic imaging system according to the embodiment.

Specifically, for example, as shown in FIG. 10, arrows B indicating the directions of the motions of the unexpected images A may be displayed.

In this case, the speeds of the movements of the unexpected images A may be indicated by the thicknesses or lengths of the arrows.

The processing apparatuses 2, 4A and 7 may analyze the motions of the unexpected images A in the dynamic images $I_1$ and $I_2$ and utilize the analysis result for analysis of the motion of the diagnosis target site.

In the above description, the example is disclosed where the hard disk, the semiconductor nonvolatile memory or the like is used as a computer-readable medium for the program according to the present invention. However, there is no limitation to this example. As another computer-readable medium, a portable recording medium, such as a CD-ROM, may be applied. Carrier waves are also applicable as a medium of providing data on the program according to the present invention via a communication line.

Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

100 Radiographic imaging system
100a Monitoring round vehicle
1 Radiographic imaging apparatus
2 Image processing apparatus (image analysis apparatus)
21 Controller
22 Communicator
23 Storage
3 Radiation generation apparatus
31 Radiation source
4 Console
41 Display
5 Housing
5a Wheel
100A Radiographic imaging system
4A Image processing apparatus (console)
100B Radiographic imaging system
7 Image processing apparatus
200 Imaging support
201 First portion
202 Second portion
N Communication network
$I_1$ Dynamic image displayed by conventional radiographic imaging system
$I_2$ Dynamic image displayed by radiographic imaging system according to the embodiment
A Unexpected image of structural object
B Arrow

What is claimed is:

1. An image processing apparatus that processes a dynamic image including a plurality of frames obtained from a radiographic imaging apparatus performing radiographic dynamic imaging, the image processing apparatus comprising:
a hardware processor that performs a process of reducing an unexpected image of a structural object other than a subject, when the structural object is unexpectedly captured in the dynamic image including the plurality of frames obtained by the dynamic imaging,
wherein the structural object other than the subject is a portion of an imaging assistant, and
wherein the process of reducing is performed so that the subject remains in a region of the dynamic image where the structural object was reduced.

2. The image processing apparatus according to claim 1, wherein the structural object further includes an imaging support that fixes the subject.

3. The image processing apparatus according to claim 2, wherein, for the imaging support, the hardware processor performs the process, based on data about at least one of an amount of radiographic transmission through the imaging support and a shape of the imaging support.

4. The image processing apparatus according to claim 1, wherein the hardware processor
determines presence or absence of the unexpected image, in each of the plurality of frames, and
applies the process to one or more frames that include the unexpected image.

5. The image processing apparatus according to claim 1, wherein the hardware processor applies the process having details identical to those of the process applied to one or more specific frames among the plurality of frames, also to other one or more frames other than the specific frames among the plurality of frames.

6. The image processing apparatus according to claim 1, wherein the hardware processor applies the process to all areas of each frame or a certain area of each frame.

7. The image processing apparatus according to claim 1, wherein the hardware processor does not perform the process, even when the unexpected image is captured in the dynamic image, provided that a predetermined condition is satisfied.

8. The image processing apparatus according to claim 7, wherein the hardware processor does not perform the process, when the unexpected image is disposed in an area that does not overlap with an area in any of the frames of the dynamic image where a diagnosis target site of the subject is captured.

9. The image processing apparatus according to claim 7, wherein the hardware processor does not perform the process, when the unexpected image has a size equal to or smaller than a predetermined threshold.

10. The image processing apparatus according to claim 7, further comprising a notifier that notifies that re-imaging is required, when a specific predetermined condition among a plurality of the predetermined conditions is satisfied.

11. The image processing apparatus according to claim 1, wherein the process of reducing is performed based on a difference between the dynamic image and image data on a frame stored in a storage in which a same diagnoses target site of the subject is captured without the unexpected image.

12. A radiographic imaging system, comprising:
a radiation source that generates radiation; and
a radiographic imaging apparatus that performs radiographic dynamic imaging, the radiographic imaging system further comprising
a hardware processor that performs a process of reducing an unexpected image of a structural object other than a subject, when the structural object is unexpectedly captured in the dynamic image including the plurality of frames obtained by the dynamic imaging,
wherein the structural object other than the subject is a portion of an imaging assistant, and
wherein the process of reducing is performed so that the subject remains in a region of the dynamic image where the structural object was reduced.

13. The radiographic imaging system according to claim 12,
wherein the radiographic imaging apparatus is portable, and
at least the radiation source has a movable configuration.

14. A non-transitory computer-readable storage medium storing an image processing program of processing a dynamic image including a plurality of frames obtained from a radiographic imaging apparatus performing radiographic dynamic imaging, the program causing a computer to perform
reducing an unexpected image of a structural object other than a subject, when the structural object is unexpectedly captured in the dynamic image including the plurality of frames obtained by the dynamic imaging,
wherein the structural object other than the subject is a portion of an imaging assistant, and
wherein the reducing is performed so that the subject remains in a region of the dynamic image where the structural object was reduced.

15. An image processing method of processing a dynamic image including a plurality of frames obtained from a radiographic imaging apparatus performing radiographic dynamic imaging, the image processing method comprising:

reducing an unexpected image of a structural object other than a subject, when the structural object is unexpectedly captured in the dynamic image including the plurality of frames obtained by the dynamic imaging,
wherein the structural object other than the subject is a portion of an imaging assistant, and
wherein the reducing is performed so that the subject remains in a region of the dynamic image where the structural object was reduced.

* * * * *